United States Patent [19]

Russell

[11] Patent Number: 4,477,912

[45] Date of Patent: Oct. 16, 1984

[54] CORRELATION DATA COMMUNICATIONS SYSTEM

[75] Inventor: James L. Russell, Germantown, Md.

[73] Assignee: Arinc Research Corporation, Annapolis, Md.

[21] Appl. No.: 348,425

[22] Filed: Feb. 12, 1982

[51] Int. Cl.³ ............................................... H04K 1/04
[52] U.S. Cl. ................................. 375/1; 340/347 DD; 178/22.14; 375/96
[58] Field of Search ....................... 375/1, 2.1, 94, 96, 375/97, 115; 371/49, 55; 178/22.1, 22.13, 22.14, 22.17; 370/18, 19; 331/78; 328/65; 340/347 DD, 351, 352

[56] References Cited

U.S. PATENT DOCUMENTS

2,894,684  7/1959  Nettleton ............................... 371/49
4,052,565  10/1977  Baxter ..................................... 375/25
4,231,113  10/1980  Blasbalg .................................. 375/1

Primary Examiner—Benedict V. Safourek
Attorney, Agent, or Firm—Parkhurst & Oliff

[57] ABSTRACT

A digital data communications system employing correlation detection is disclosed as comprising an encoding system which encodes successive k-bit data words from a data source into predetermined start-stop phases of either a $2^k$-bit repeating pseudorandom binary code or a $2^k-1$ bit repeating pseudorandom binary code and a decoding system which receives the stream of ones and zeros in the pseudorandom binary code from the encoder and reproduces therefrom, using a correlation detector and associated circuitry, a replica of the original k-bit data word from the data source. Undesirable signal variations in the output of the correlation detector caused by a frequency translation error introduced in the transmission and reception of the pseudorandom binary code is eliminated by a feedback system which detects the effects of the frequency translation error at the output of the correlation detector and applies a frequency correction signal component to the pseudorandom binary code which offsets the frequency translation error prior to introduction of the pseudorandom binary code to the correlation detector.

31 Claims, 8 Drawing Figures

CORRELATION DATA COMMUNICATIONS SYSTEM

FIELD OF THE INVENTION

The present invention relates to digital data communications systems and, more particularly, to such systems which employ correlation detection to determine the identity of an incoming encoded digital code word.

BACKGROUND OF THE INVENTION

The use of correlation techniques in a data communications system decoding system to identify an incoming digital code word is well known. In a correlation decoding system a correlation detector is provided which matches an incoming digital code word on a bit-for-bit basis with a plurality of locally generated reference code words. When a substantial match with one of the reference code words is found, the correlator indicates this fact by an output signal, the amplitude of which represents the degree of bit-for-bit matching, and the reference code word with which the incoming digital code word is then being compared is identified as the received code word.

If a communication system employing a correlation detector in the decoding system uses Single Side Band (SSB) modulation for transmission and reception, Doppler shifts in the medium and carrier reinsertion errors in the receiver will shift each frequency in the demodulated output signal by some translation error which is the same for all output frequencies at the demodulator at any given instant, but which can vary with time due to changes in relative velocities of the transmitter and receiver and to variations in frequency standards in the transmitter and receiver. For SSB receivers and transmitters in the high frequency (HF) band (2 to 30 MHz), frequency translation errors in the demodulator output of up to ±100 Hz are common.

When a frequency translation error occurs, it has been found that the output signal of the correlation detector rotates in phase at the translation error frequency providing the envelope of the output signal of the correlation detector with an amplitude which is sinusoidal, varying at the translation frequency. With very low (or even zero) translation errors, if the phase of the correlation detector output is near a sinusoidal null of the amplitude variation, the correlation detector output will be low or zero and will remain so until the phase rotates away from the null. Such a low output of the correlation detector may cause the decoding system to fail to properly recognize a match between an incoming digital code word and one of the internally generated reference code words.

It is also often desirable to retrofit a data communications system to an existing operational radio transmitter and receiver system to avoid the expense of designing an entirely new transmission and reception system for data transmission. If a data communications system is retrofit to High-Frequency (HF) radio transmitters and receivers designed for Single Side Band (SSB) voice transmissions, a problem exists in that the limited audio band pass (usually 300 to 2500 Hz) of the transmitters and receivers prohibits use of wide-band spread-spectrum techniques commonly employed at UHF and microwave frequencies to improve code transmission reliability. At the same time the many forms of signal degradation associated with HF transmitters and receivers, such as fading, high interference, multipath propogation, etc. places demands on the data communications system which are not easily satisfied by simple frequency-shift keying or other conventional digital transmission techniques. To successfully permit utilization of in place High-Frequency SSB radio transmitters and receivers for data communications, the data communications system must:

a. provide a unique wave form in space which is highly unlikely to be duplicated by probable sources of interference or to be modified by such interference to produce undetected output errors;

b. provide a high degree of error detection and correction;

c. provide the ability to accept the waveform to which a receiver is synchronized while rejecting interference (either from other transmitters or from multipath propagation of the desired transmission) from similar waveforms not precisely in synchronism;

d. permit as high a communications data rate as possible within the transmitter/receiver bandpass limitations;

e. be implemented through addition of external encoder and decoder circuitry without modification of existing transmitters and/or receivers and without access to transmitter carrier frequency control circuits to achieve phase or frequency modulation nor to receiver RF or IF circuitry as would be required for demodulation of frequency or phase modulation or conventional correction of SSB translation errors; and f. provide for synchronization of the demodulator to received signals and compensation for frequency translation errors over the same range of signal-to-interference ratios as required for signal processing after synchronization is achieved.

SUMMARY OF THE INVENTION

The present invention has been devised to eliminate the frequency translation problem in data communications systems employing correlation detection techniques in the decoder and to provide a reliable and accurate data communications system which can be easily retrofit to existing High Frequency SSB radio transmitters and receivers.

Accordingly, one object of the invention is the provision of a digital data communications system wherein the effects of frequency translation errors induced during transmission or reception of a digital code word are eliminated at the output of the decoding system correlation detector thereby improving the overall reliability of the decoding operation. This object is achieved by providing a feedback system which detects the effects of a frequency translation error at the output of the correlation detector and applies a frequency correction signal component to received digital code words which offsets the frequency translation error at the input to the correlation detector.

An additional object of the invention is the provision of a data communications system which permits use of unmodified currently operational High-Frequency (HF) radio transmitters and receivers designed for single side band (SSB) voice transmissions to provide high-quality digital data communications and which satisfies the transmission and reception requirements noted earlier. This object of the invention is achieved through a data communications system, employing an encoding and decoding system, which uses: (1) an encoding system which generates pseudorandom binary code words as start-stop phases of a repeating pseudorandom code for transmission on which data to be transmitted is impressed by cyclic code shift keying (CCSK), (2) a decoding system which employs correlation detection of received baseband pseudorandom binary code words, and (3) feedback from the correlation detector output through a feedback control loop which eliminates the above-noted frequency translation errors from the received pseudorandom binary code words and permits the decoding system output to be an undistorted representation of the data provided as input to the encoding system.

A further object of the invention is the minimization of distortion of the pseudorandom binary code words caused by passage through the limited bandpass of existing receivers and transmitters by selection of a code for which truncation of the code's frequency spectrum below 300 Hz and above 2500 Hz does not significantly degrade signal-to-interference ratios, nor unacceptably degrade the correlation function of the codeword.

A further object of the invention is the provision of a method for CCSK encoding of pseudorandom binary code words which permits decoding by simple and economical circuitry without the need for microprocessors and look up tables, or other more complex methods conventionally used for CCSK decoding.

An additional object of the invention is the provision of a unique encoding system for generating pseudorandom binary code words having an overall D.C. balance (equal number of ones and zeros) which may be used to advantage in a data communications system.

These and other objects and advantages of the invention will be readily understood from the following detailed description of the invention which is presented in connection with the accompanying drawings.

DETAILED DESCRIPTION OF THE INVENTION

The data communications system of the invention is particularly designed to be incorporated into existing transmitting and receiving systems which have a voice data channel and for the purpose of exemplary description the invention will be described for use in a SSB (single side band) High Frequency voice communications system. However, it should be appreciated that the data communications system of the invention can be used in other transmission/reception systems as well, and that the encoding system of the invention may be used with or without the decoding system of the invention and vice versa.

Figure 1:
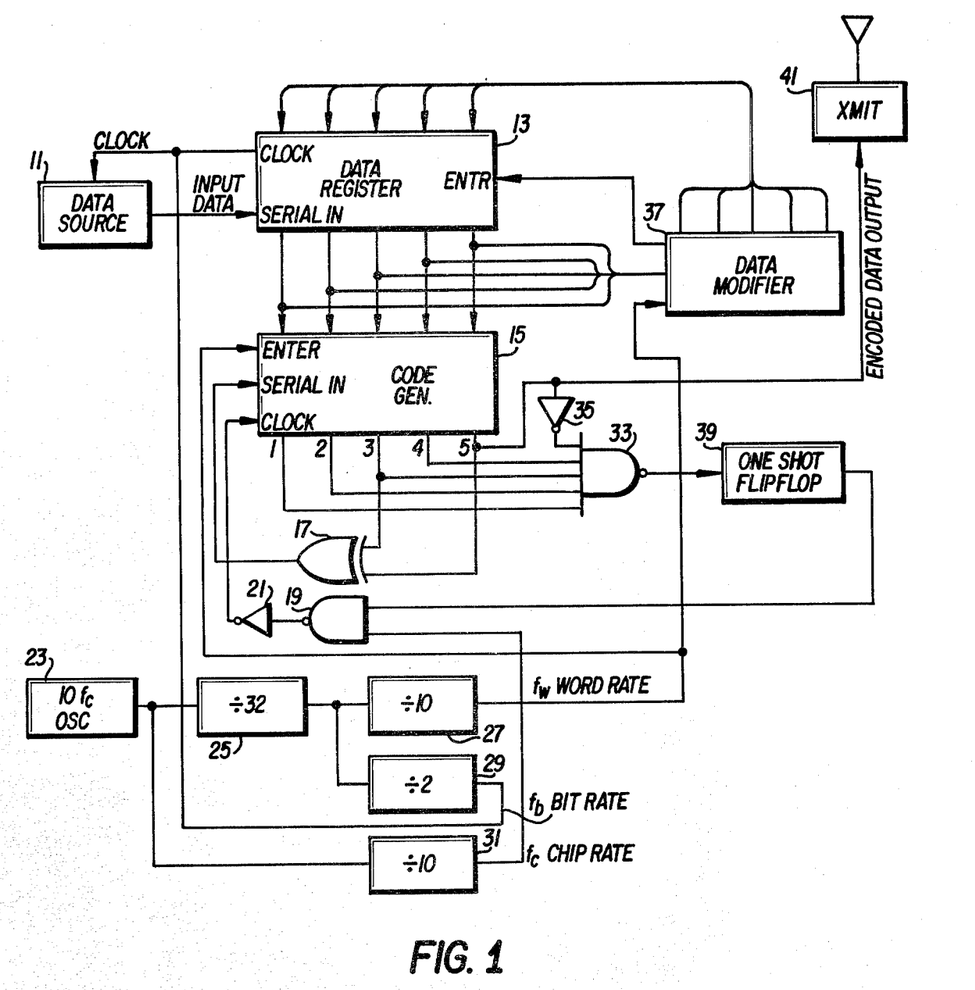
FIG. 1 illustrated a unique digital encoding system which may be used in the data communications system of the invention.

One exemplary encoding system which may be used in the invention is illustrated in FIG. 1. In this system source digital code words having k bits are transmitted as digital code words having $2^k$ bits, $2^k-1$ bits being generated by a pseudorandom code generator 15, and an additional single bit being added to the output of the pseudorandom code generator to form an even number of bits for transmission. Thus, for example, if a five bit digital source code word is input to the encoding system, the output thereof would be 32 ($2^5$) chips (bits) in length.

Referring to FIG. 1, a data source 11 supplying a serial stream of digital code is clocked by the output of a frequency divider 29 which applies a clocking signal at a predetermined bit rate $f_b$. The clocking signal is also fed as a clocking input to a data register 13 which receives at a serial input thereto the output from data source 11. Data register 13 is of the type which may receive data into the various register positions either by the serial input connected to the output of the data source 11 or by parallel input which is connected to the output of a data modifier 37, which is described more fully below. The data register contains a number of bit positions corresponding to the number of bits from data source 11 to be encoded on an output pseudorandom binary code word, e.g. 5 for the example given above. After the selected number of data bits from data source 11 have been loaded into data register 13 its contents are transferred in parallel to a pseudorandom code generator 15 by an ENTER signal (word rate clock signal fw) applied to code generator 15 by frequency divider 27. Pseudorandom code generator 15 is a well known device which generates at an output, taken, for example, at register stage 5, a pseudorandom binary code word which is $2^k-1$ bits long where k is the number of register stages (which correspond to the k bits of a digital code word to be encoded). The number of possible pseudorandom binary code words which can be generated by code generator 15 is $2^k-1$ and each is a different start-stop phase of a repeating $2^k-1$ bit pseudorandom code pattern. The code generator 15 is essentially a shift register which continually cycles an input code word thereto through the register with register stages 3 and 5 being summed by an exclusive OR circuit 3 and fed back as a serial input to the code generator 15. A clock signal supplied to the clock terminal of the pseudorandom code generator 15 advances the serial data through the code generator in cyclic fashion. The clock signal is supplied by an inverter 21 which receives a clocking signal through NAND gate 19 from the output of frequency divider 31 which supplies a clocking signal at chipping rate $f_c$. Thus, the serial data stream at the output of the pseudorandom code generator 15 (bit position 5) has a chipping rate of $f_c$. The first five bits of the pseudorandom binary code word at the output of code generator 15 correspond to the five bits originally loaded into code generator 15.

After generating a pseudorandom binary code word corresponding to an input digital code word, pseudorandom code generator 15 is reloaded with a new incoming digital code word by the output of frequency divider 27 which applies a word rate clocking signal $f_w$ to the ENTER input of pseudorandom code generator 15.

As discussed above, a pseudorandom coded output signal having $2^k$ bits is generated by the encoding system. However, a characteristic of pseudorandom code generator 15 is that $2^k-1$ bits are generated. Accordingly, an additional bit is generated and added to the output of pseudorandom code generator 15. To accomplish this, an NAND gate 33 is connected to the output stages of code generator 15 to determine when a predetermined code condition exists therein. For example, NAND gate 33 may be arranged to detect the state "11110". Upon detection of this state, an output signal from NAND gate 33 causes a one-shot flip flop 39 to generate a pulse signal which inhibits the clocking signal output of NAND gate 19 so that no clocking signal is applied at the clock input to pseudorandom code generator 15 for the time duration of the one-shot flip-flop 39. The pulse from the one-shot flip-flop is sufficient to prevent one clock pulse from the output of frequency divider 31 from being applied through an NAND 19 and inverter 21 to the clocking input of pseudorandom code generator 15. Accordingly, whatever bit code ("0" for the code "11110") is then in register stage 5 of the pseudorandom code generator 15 is held for an additional clock signal. When the output pulse from one-shot flip-flop 39 disappears NAND gate 19 is reenabled and clock signals from the output of the divider 31 are again supplied to the clock input of the code generator. Thus, for each n-bit digital code word inputted to code generator 15 from the data register 13, a $2^k$ digital code word is generated at the output thereof.

The output of the pseudorandom code generator 15 is supplied to a transmitter 41 which may be a conventional RF transmitter using any suitable type of modulation. As noted, a SSB HF transmitter is particularly suitable.

The word rate $f_w$, bit rate $f_b$, and chip rate $f_c$ clocking signals are respectively provided by dividers 27, 29 and 31 which are run off oscillator 23 operating at a frequency of 10 $f_c$. Divide-by-ten divider 27 and divide-by-two divider 29 receive the output of oscillator 23 through a divide-by-thirty-two frequency divider 25, while divide-by-ten frequency divider 31 directly receives the output of oscillator 23.

As well known, when a pseudorandom code generator is loaded with an all zero code word, e.g. "00000" for a 5 bit system, its output will be a stream of all zeros and it will lock in this state. To eliminate the possibility of an "all zero" code word being loaded into the code generator 15, data modifier 37 continuously monitors the output of data register 13 and whenever a prohibited digital code word is entered therein, for example, all zeros, the data modifier 37 substitutes a different code word into the data register 13. The data modifier 37 receives the word rate $f_w$ output from divider 27 and checks every digital code word in data register 13 just before its being loaded into pseudorandom code generator 15 so the forbidden code never is loaded in the code generator. When a forbidden code word is detected the data modifier 37 substitutes a different digital code word into register 13 and supplies a gating signal to data register 13 which allows the data register to accept, by parallel input, the output of data modifier 37.

Data modifier 37 may also be used to prevent any other incoming digital code words from being fed to random code generator 15. For example, the digital code word "11111" can be converted to the sequence "01111" by data modifier 37 in order to simplify decoder circuitry (of if the pseudorandom code generator is using inverted logic wherein "11111" would be the prohibited sequence).

It should be noted that the addition of a chip (added bit) to a conventional maximal length code word of length $2^k-1$ to produce a $2^k$-chip word is not required for CCSK encoding and, in fact, degrades to some extent, the desirable correlation characteristics of the $2^k-1$ chip binary code word produced by code generator 15. However, the added chip permits one to attain an additional pseudorandom binary code word for encoding a forbidden n-bit data word (e.g. all zero). Another way to encode a "forbidden" all-zero (or all-one for code generators with inverted logic) data sequence is to generate in the encoding system any selected one of the other $2^k-1$ sequences, but with the code inverted (all zeros changed to ones and all ones to zeros). The decoding system correlation decoder can sense this inversion and substitute the forbidden sequence for the inverted word while, at the same time, inhibiting circuits (such as the detranslation feedback loop described below) which would be adversely affected by the inversion. This alternative encoding technique is illustrated in FIG. 6.

Figure 6:
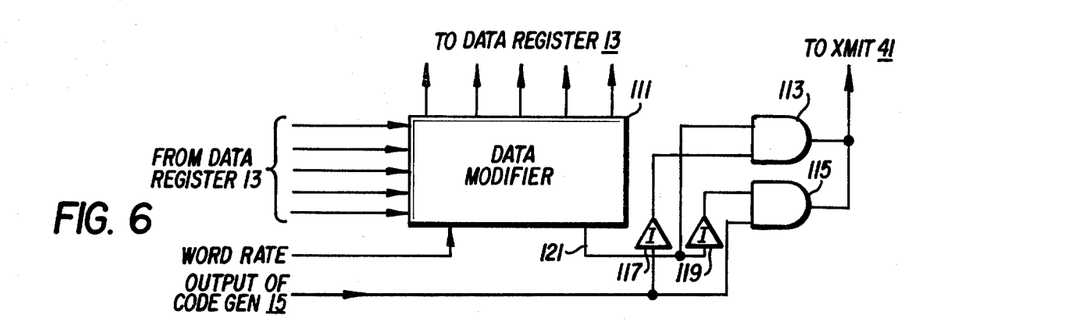
FIG. 6 illustrates another modification to the encoding system shown in FIG. 1.

As shown in FIG. 6, a data modifier 111 monitors the parallel output from data register 13 for a prohibited code word and substitutes a permitted code word into register 13 as described earlier. In addition, the data modifier generates a control signal which enables a gate 113 and disables a gate 115 through inverter 119. Gate 113 receives at another input an inverted version of the output of code generator 15, while gate 115 receives at another input the non-inverted output of code generator 15. In this arrangement when data modifier 111 detects the presence of a prohibited bit pattern in data register 13 it loads a different, permitted code word therein and supplies a control signal on line 121 which disables gate 115 and enables gate 113 to thereby allow the output of code generator 15 to be inverted by inverter 117 prior to its being fed to transmitter 41. The inverted pseuorandom binary code word can then be detected in a system decoder and converted to the proper bit patterns.

In the process of generating the $2^k$ bit pseudorandom binary code word which is applied to transmitter 41, the encoding system is arranged so that the added bit, which occurs by holding the code generator 15 in a predetermined output position for one clock pulse by NAND gate 33 and one-shot flip-flop 39, can be a bit value which obtains a balance in the overall number of ones and zeros in the $2^k$ bit encoded output. In the arrangement shown, this balancing occurs by the addition of a "0" to the 31 ($2^k-1$) bits generated by the output of the pseudorandom code generator 15 when operating normally. This additional "0" is thus generated by sensing a bit pattern in the code generator 15 which has "0" in the bit 5 stage. One such convenient bit pattern is "11110" as described above. However, it should be clear that the additional zero could be generated at other points in the output of the pseudorandom code generator 15 to provide an added "0" to balance the overall number of ones and zeros in the transmitted pseudorandom binary code word. Moreover, if pseudorandom code generator 15 produces one more "0"s than "1"s in its output (as would occur, for example, with inverted logic), then the added bit would be a "1".

The balancing of the overall number of ones and zeros in the generated $2^k$ bit pseudorandom binary code word has the advantage of providing a DC balance to the overall signal which makes for a simpler design of decoding circuitry. Table I illustrates an exemplary pseudorandom coding ($2^k$) obtained at the output of code generator 15 for the various states of a 5-bit input data word. The asterisks denote zeros added in the manner described above.

with which the data communications system may be used. Such errors can be caused by Doppler shifts in the

TABLE I

| | DATA | 31 BIT CODE -- ASTERISKS ARE 0's ADDED TO MAKE 32 CHIPS |
|---|---|---|
| 1 | 0 0 0 0 1 | 0 0 0 0 1 0 0 1 0 1 1 0 0 0*1 1 1 1 0 0 0 1 1 0 1 1 1 0 1 0 1 |
| 2 | 0 0 0 1 0 | 0 0 0 1 0 0 1 0 1 1 0 0 0*1 1 1 1 0 0 0 1 1 0 1 1 1 0 1 0 1 0 |
| 3 | 0 0 0 1 1 | 0 0 0 1 1 0 1 1 1 0 1 0 1 0 0 0 0 1 0 0 1 0 1 1 0 0 0*1 1 1 1 |
| 4 | 0 0 1 0 0 | 0 0 1 0 0 1 0 1 1 0 0 0*1 1 1 1 0 0 0 1 1 0 1 1 1 0 1 0 1 0 0 |
| 5 | 0 0 1 0 1 | 0 0 1 0 1 1 0 0 0*1 1 1 1 0 0 0 1 1 0 1 1 1 0 1 0 1 0 0 0 0 1 |
| 6 | 0 0 1 1 0 | 0 0 1 1 0 1 1 1 0 1 0 1 0 0 0 0 1 0 0 1 0 1 1 0 0 0*1 1 1 1 0 |
| 7 | 0 0 1 1 1 | 0 0 0*1 1 1 1 0 0 0 1 1 0 1 1 1 0 1 0 1 0 0 0 0 1 0 0 1 0 1 1 |
| 8 | 0 1 0 0 0 | 0 1 0 0 0 0 1 0 0 1 0 1 1 0 0 0*1 1 1 1 0 0 0 1 1 0 1 1 1 0 1 |
| 9 | 0 1 0 0 1 | 0 1 0 0 1 0 1 1 0 0 0*1 1 1 1 0 0 0 1 1 0 1 1 1 0 1 0 1 0 0 0 |
| 10 | 0 1 0 1 0 | 0 1 0 1 0 0 0 0 1 0 0 1 0 1 1 0 0 0*1 1 1 1 0 0 0 1 1 0 1 1 1 |
| 11 | 0 1 0 1 1 | 0 1 0 1 1 0 0 0*1 1 1 1 0 0 0 1 1 0 1 1 1 0 1 0 1 0 0 0 0 1 0 |
| 12 | 0 1 1 0 0 | 0 1 1 0 0 0*1 1 1 1 0 0 0 1 1 0 1 1 1 0 1 0 1 0 0 0 0 1 0 0 1 |
| 13 | 0 1 1 0 1 | 0 1 1 0 1 1 1 0 1 0 1 0 0 0 0 1 0 0 1 0 1 1 0 0 0*1 1 1 1 0 0 |
| 14 | 0 1 1 1 0 | 0 1 1 1 0 1 0 1 0 0 0 0 1 0 0 1 0 1 1 0 0 0*1 1 1 1 0 0 0 1 1 |
| 15 | 0 1 1 1 1 | 0 0*1 1 1 1 0 0 0 1 1 0 1 1 1 0 1 0 1 0 0 0 0 1 0 0 1 0 1 1 0 |
| 16 | 1 0 0 0 0 | 1 0 0 0 0 0 1 0 0 1 0 1 1 0 0 0*1 1 1 1 0 0 0 1 1 0 1 1 1 0 1 0 |
| 17 | 1 0 0 0 1 | 1 0 0 0 1 1 0 1 1 1 0 1 0 1 0 0 0 0 1 0 0 1 0 1 1 0 0 0*1 1 1 1 |
| 18 | 1 0 0 1 0 | 1 0 0 1 0 1 1 0 0 0*1 1 1 1 0 0 0 1 1 0 1 1 1 0 1 0 1 0 0 0 0 |
| 19 | 1 0 0 1 1 | 1 0 0 0*1 1 1 1 0 0 0 1 1 0 1 1 1 0 1 0 1 0 0 0 0 1 0 0 1 0 1 |
| 20 | 1 0 1 0 0 | 1 0 1 0 0 0 0 0 1 0 0 1 0 1 1 0 0 0*1 1 1 1 0 0 0 1 1 0 1 1 1 0 |
| 21 | 1 0 1 0 1 | 1 0 1 0 1 0 0 0 1 0 0 1 0 1 1 0 0 0*1 1 1 1 0 0 0 1 1 0 1 1 |
| 22 | 1 0 1 1 0 | 1 0 1 1 0 0 0*1 1 1 1 0 0 0 1 1 0 1 1 1 0 1 0 1 0 0 0 0 1 0 0 |
| 23 | 1 0 1 1 1 | 1 0 1 1 1 0 1 0 1 0 0 0 0 1 0 0 1 0 1 1 0 0 0*1 1 1 1 0 0 0 1 |
| 24 | 1 1 0 0 0 | 1 1 0 0 0 1 1 0 1 1 1 0 1 0 1 0 0 0 0 1 0 0 1 0 1 1 0 0 0*1 1 1 |
| 25 | 1 1 0 0 1 | 1 1 0 0 0*1 1 1 1 0 0 0 1 1 0 1 1 1 0 1 0 1 0 0 0 0 1 0 0 1 0 |
| 26 | 1 1 0 1 0 | 1 1 0 1 0 1 0 0 0 0 1 0 0 1 0 1 1 0 0 0*1 1 1 1 0 0 0 1 1 0 1 |
| 27 | 1 1 0 1 1 | 1 1 0 1 1 1 0 1 0 1 0 0 0 0 1 0 0 1 0 1 1 0 0 0*1 1 1 1 0 0 0 |
| 28 | 1 1 1 0 0 | 1 1 1 0 0 0 1 1 0 1 1 1 0 1 0 1 0 0 0 0 1 0 0 1 0 1 1 0 0 0*1 1 |
| 29 | 1 1 1 0 1 | 1 1 1 0 1 0 1 0 0 0 0 1 0 0 1 0 1 1 0 0 0*1 1 1 1 0 0 0 1 1 0 |
| 30 | 1 1 1 1 0 | 1 1 1 0 0 0 1 1 0 1 1 1 0 1 0 1 0 0 0 0 1 0 0 1 0 1 1 0 0 0*1 |
| 31 | 1 1 1 1 1 | 0*1 1 1 1 0 0 0 1 1 0 1 1 1 0 1 0 1 0 0 0 0 1 0 0 1 0 1 1 0 0 |
| 32 | 0 0 0 0 0 | 1 1 1 1 0 0 0 1 1 0 1 1 1 0 1 0 1 0 0 0 0 1 0 0 1 0 1 1 0 0 0* |

As evident from the above Table, each of the pseudorandom binary code words generated at the output of code generator 15 represents a different start-stop phase of an endlessly repeating pseudorandom n-bit pattern, where $n=2^k-1$ and k and n are integers.

Although the encoding system of FIG. 1 generates a preferred $2^k$ bit pseudorandom code from a k-bit data code word, it can also be used to generate a $2^k-1$ bit pseudorandom binary code (Table I without the added zeros) by the elimination of inverter 35, gate 33, one shot flip-flop 39, gate 19 and inverter 21 and directly connecting the output of divider 31 to the clock input of code generator 15. These changes will enable code generator 15 to operate as a conventional pseudorandom code generator and there will be no addition of a bit to the output of code generator 15 as described earlier. The data modifier circuit shown in FIG. 6 will work with the encoding system configured as just described to produce a $2^k-1$ pseudorandom code output in which each of the binary code words generated at the output of code generator 15 represents a different start-stop phase of a repeating n-bit pattern where $n=2^k-1$.

The data communications system of the invention employs correlation detection in the decoding system to reproduce the input data words to register 13 from the transmitted and received pseudorandom binary code.

Figure 4A:
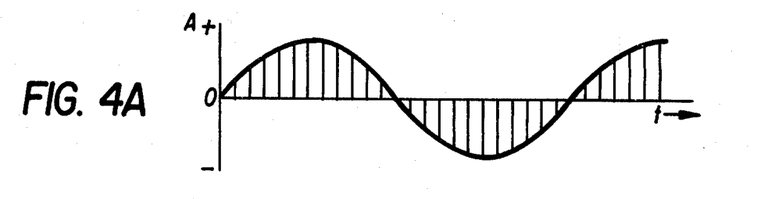
FIG. 4a and 4b respectively illustrate the envelope of the output of a correlation detector used in the decoding system, with and without aberrations caused by a frequency translation error.

A characteristic of decoding systems employing correlation detection for identifying incoming digital data, such as the pseudorandom binary code generated by the encoding system of FIG. 1, is that the pulsed output of the correlation detector, which occurs whenever a substantial match is found between an incoming pseudorandom binary code word and one of a plurality of locally generated reference pseudorandom binary code words, rotates in phase at the frequency of any frequency translation error in single side band transmission systems with which the data communications system may be used. Such errors can be caused by Doppler shifts in the transmitting medium and carrier reinsertion errors in the receiver demodulator. This results in the correlation detector output signal envelope having a sinusoidal amplitude component impressed thereon due to the frequency translation error (FIG. 4a). The translation error shifts each frequency of the demodulator output by some translation error which is the same for all demodulated output frequencies at any given instant, but which varies with time due to changes in relative velocities of the transmitter and receiver and to variations in frequency standards in the transmitter and receiver. As noted earlier, for SSB transmitters and receivers in the high frequency (HF) band (2–30 Mhz) translation errors of up to ±100 hz are common.

The frequency translation error, which occurs as amplitude and phase variations in the output waveform of the correlation detector, may result in a correlation detector output signal being "missed" in the decoding system because it may occur at a point near a sinusoidal null in the output envelope of the correlation detector or because it has an inverted polarity. To eliminate this problem, the decoding system of the invention, as illustrated in FIG. 2, includes a detranslation circuit which eliminates the sinusoidal variations in the output of the correlation detector.

Figure 2:
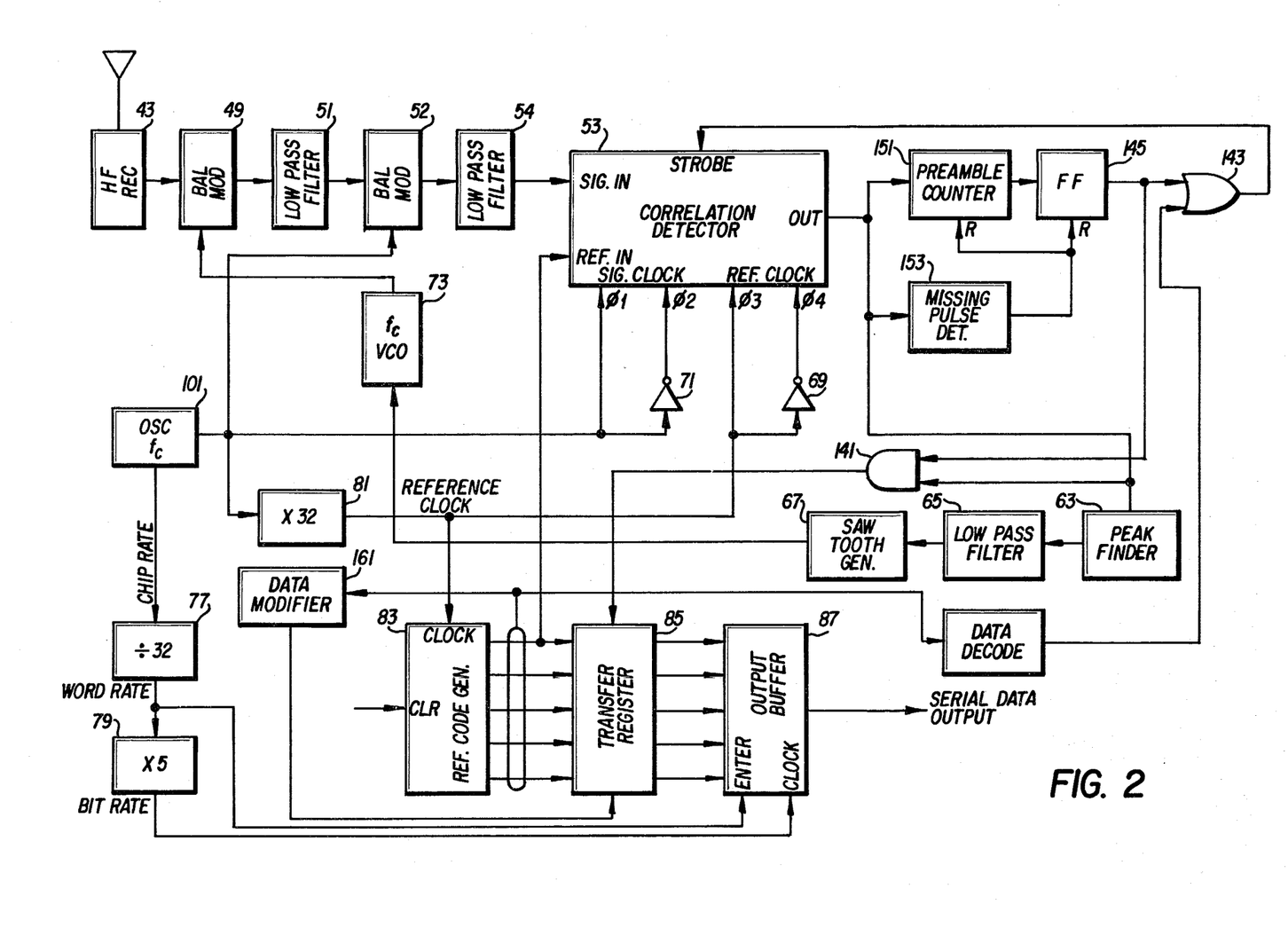
FIG. 2 illustrates a decoding system which may be used in the data communications system of invention.

Before describing FIG. 2 in detail, it should be pointed out that the decoding system shown therein correlates incoming pseudorandom binary code words with similar locally generated reference pseudorandom binary code words. However, it should be understood that the decoding system of the invention can be used with any type of digital coding and that pseudorandom coding is not at all necessary. However, for the purpose of simplifying subsequent description, the pseudorandom binary code words as generated by the encoding system of FIG. 1 will assumed as being received at the input to the decoding system of FIG. 2.

Referring to FIG. 2, a High Frequency single sideband, receiver 43 receives and demodulates a transmitted signal containing a stream of pseudorandom binary code words. In normal operation, this signal would then be fed to a correlation detector circuit which would compare the arriving pseudorandom binary code words successively with each one of a plurality of locally generated reference pseudorandom code words, the correlator detector signaling a match when found. In the decoding system of FIG. 2, the incoming demodulated pseudorandum binary code words are fed to a balanced modulator 49 where the pseudorandom binary code words modulate a first local carrier at the output of a voltage control oscillator 73. The output from balanced modulator passes through a low pass filter 51 which removes a higher frequency product of the modulation process. The resulting single side band at the output of filter 51 is demodulated by using it to modulate a second local carrier whose frequency is fixed at the approximate center frequency of the voltage controlled oscillator 73 supplying the first local carrier. The second local carrier is supplied by oscillator 101. The upper sideband of the resulting sideband pair is removed by filter 54 leaving a lower side band which is the same as the received signal except that an additional translation error, relative to the received signal, equal to the difference in frequency between the first and second local carrier frequencies has been introduced. The output of low pass filter 54 is applied as an input to correlation detector 53. A feedback loop, described in further detail below, is used to adjust the voltage controlled oscillator 73 so that this translation error is equal and opposite to that present in the received signal and the single sideband resulting from the second modulation is the originally transmitted pseudorandom binary code without translation error.

The center frequency of the voltage controlled oscillator 73 is selected to facilitate removal of one of the modulation side bands by filter 51 and may be, as in the embodiment here discussed and illustrated in FIG. 2, the chipping frequency fc selected for the system. The control range of the voltage controlled oscillator 73 is made wide enough to permit the output frequency to be varied over a range equal to the expected range of the translation error.

Correlation detector 53 may be a standard integrated circuit device, for example, a Reticon R5403. The correlator contains (for a 32 chip code word) two 32-chip "bucket brigade" delay lines. Incoming pseudorandom binary code words are shifted through one of the delay lines by two phase clock signals $\phi_1$ and $\phi_2$. The other delay line serially receives the locally generated reference pseudorandom binary code words which are shifted in by clock signals $\phi_3$ and $\phi_4$. A multiplier circuit is provided between each cell of the delay line for the incoming pseudorandom binary code words and a like numbered cell for incoming pseudorandom reference binary code words. A strobe signal to the STROBE input of the correlation detector causes the signals in the delay line cells to be transferred to the multiplier circuit where they are multiplied and the resulting products summed. When the STROBE input is held in a predetermined logic "1" state the contents of the delay line cells will be repeatedly supplied to the multiplier circuit for multiplication. The products of the multiplier circuit are summed into the correlation detector output to provide a continuous summation of the products of each chip. When a reference and incoming pseudorandom code word are alike, all 32 products are positive and add to produce an output pulse 32 times as large in amplitude as a signal due to the multiplication of a single chip. When some chips are alike and some are unlike, the negative products formed by unlike chips are subtracted from the sum of products of the like chips and provide an amplitude at the output of the correlator which is proportional to the degree of match found between the incoming pseudorandom binary code word and a locally generated reference pseudorandom binary code word.

The incoming digital code word is advanced through the correlator by the output of oscillator 101 at the chipping frequency $f_c$ which is supplied to the first clock $\phi_1$ input to the correlator 53 and by an inverted signal applied through inverter 73 to the second clock $\phi_2$ input to correlator 53.

The reference code words, generated by reference code generator 83, are advanced through correlator detector 53 by two phase clock signals $\phi_3$ and $\phi_4$ at rate of $32 \times f_c$ formed by a multiplier 81 which multiplies the output $f_c$ of oscillator 101. Because of the 32 to 1 frequency ratio between the incoming pseudorandom binary code word and reference pseudorandom binary code words which are clocked into the correlator 53, all 32 possible reference codes are stepped through the reference delay line between successive clock cycles which control the shifting of the incoming digital code words through correlator detector 53.

Code generator 83 generates a continuously repeating code identical to the basic code generated at the output of the encoding system (FIG. 1). Since the number of cells in the correlator detector is same as the number of chips in the code, the five chips in the reference code generator are always the first five chips of the word in the correlator. Thus, when a match is found between an arrriving digital code word and a locally generated reference code word by correlator detector 53 the output thereof sets a transfer register 85 to the same five bits as exist in the reference code generator 83. This data, which is a replica of the k-bit digital code word originally loaded in data register 13, is then transferred to output buffer 87 at the start of the next word interval as determined by frequency divider 77, where it is serially read out at a bit rate determined by frequency multiplier 79 which multiplies by five the output of frequency divider 77.

At the initiation of a code transmission from the encoding system (FIG. 1) a preamble pseudorandom binary code word is repeatedly generated in a predetermined number of times by repeatedly supplying a predetermined k-bit data word to data register 13. The resulting pseudorandom code word which is repeatedly generated is used by the decoding system to synchronize with the encoding system. A data decoder 131 in the decoding system is connected to the output of reference code generator 83 and determines whenever the k-bit data word appears which is used in the encoding system to generate the preamble pseudorandom binary code word. Upon detecting this signal decoder 131 supplies a pulse strobe signal, through OR gate 143 to the STROBE input of correlation detector 53 causing it to load the corresponding reference pseudorandom binary code word in the reference delay line cells of the correlation detector into the correlation detector multiplier circuit. This reference pseudorandom binary code word is held in the multiplier circuit until a new reference pseudorandom binary code word can be loaded which occurs upon the occurrence of another strobe signal. The held reference pseudorandom code word is repeatedly compared in correlation detector 53 with the incoming preamble pseudorandom code and when a predetermined number of "matches" is found, the decoding system is considered synchronized with the encoding system.

To determine synchronization a counter 151 is connected to the output of correlation detector 53. Counter 151 counts the "matches" found by the correlation detector and whenever a predetermined number of "matches" is found counter 151 sets flip-flop 145 which supplies a continuous strobe signal through OR gate 143 to the STROBE input of correlation detector 53. This causes correlation detector 53 to continuously feed new reference code words as they appear from code generator 83 into the multiplier circuit for comparison with pseudorandom code words arriving from the encoding system. The strobe output of flip-flop 145 also enables a gate 141 which permits, when enabled, the output of correlation detector 53 (whether positive or negative) to be supplied to a transfer register 85. The output of correlation detector 53 is always supplied to peak finder 63 to enable the translation error feedback loop, described in greater detail below, to operate during synchronization. After synchronization is achieved, transfer register 85 is operated by the positive output only of correlation detector 53 to output on n-bit data word corresponding to an arriving pseudorandom binary code word.

The synchronization detecting circuits including counter 151 and flip-flop 145 are reset upon the cessation of a transmission from the encoding system and this is recognized by a missing pulse detector 153 which supplies a signal which resets counter 151 and flip-flop 145 after the output of correlation detector 53 has disappeared for a predetermined length of time.

The predetermined number of preamble pseudorandom code words which are transmitted are sufficient in number to allow adequate time for the frequency translation error feedback loop, described below, to eliminate the effect of frequency translation errors at the input (and correspondingly the output) of correlation detector 53).

If a data modifier 37 (FIG. 1) was used in the encoding system, a similar data modifier 161 is required in the decoding system to detect the arriving pseudorandom binary code for the prohibited k-bit code word and to load transfer register 85 with the proper k-bit code word to which the arriving pseudorandom code word corresponds.

Figure 7:
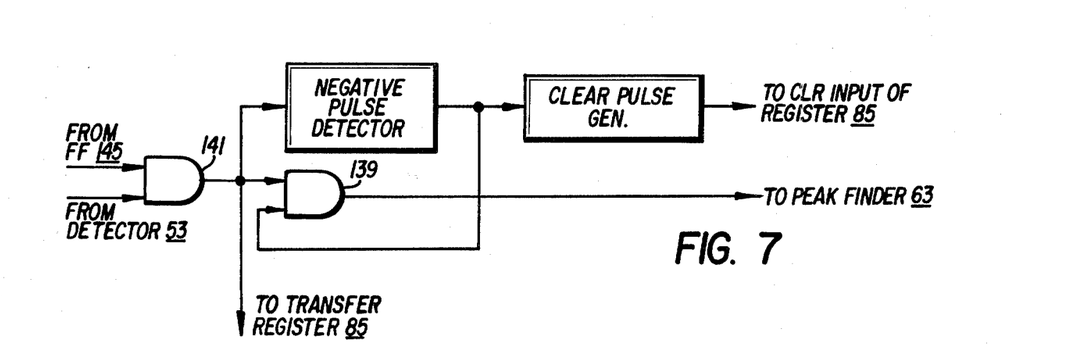
FIG. 7 illustrates a modification to the decoding system illustrated in FIG. 2.

If data modifier 111 (FIG. 6) is used in the encoding system to generate an inverted pseudorandom binary code word for a prohibited k-bit digital code word, the data demodifer 161 of FIG. 2 would be replaced by the circuit illustrated in FIG. 7. In the FIG. 7 circuit, the correlation detector output (whether positive or negative) which appears at the output of gate 141 after synchronization is achieved (and the translation frequency error feedback loop is locked) is supplied to a negative pulse detector 137. A characteristic of correlation detector 53 is that if an "inverted" arriving pseudorandom code word is compared with its "non-inverted" counterpart, a negative output signal occurs, the amplitude of which is determined by the degree of "non-match" between the compared code words. Thus, negative pulse detector 137 will determine when an "inverted" pseudorandom code word arrives from the encoding system. The output of negative pulse detector 137 is supplied to an input of AND gate 139 which receives at its other input the output of gate 141. Gate 139 functions to inhibit the negative correlation detector output from gate 141 from being supplied to peak finder 63. Thus the peak finder 63 is not affected by negative outputs of correlation detector 53 after the feedback loop described below is locked. The output of negative pulse detector is also supplied to a pulse generator 135 which generates a CLEAR signal which is supplied to transfer register 85. This CLEAR signal causes the transfer register 85 to clear itself so its output lines assume an "all zero" state corresponding to the prohibited "all zero" k-bit digital code word which was modified in the encoding system. If a different prohibited k-bit digital code word is modified in the encoding system, the output of pulse generator 135 would be used to load transfer register 85 with the appropriate prohibited data word. Transfer register 85 is arranged so that only positive outputs of correlation detector will cause it to parallel load data from the reference code generator 83 so that whenever the "inverted" pseudorandom code word is detected transfer register 85 is not loaded with the output of reference code generator 83 but is merely cleared by the output of pulse generator 135 (or loaded with appropriate data by the output of pulse generator 135 if a prohibited k-bit data word is other than all zero sequence).

If correlation detector 53 were directly connected to the output of the high frequency receiver 43, as would be the case in a normal correlation decoding system, the envelope of its output signal would be as shown in FIG. 4a, varying in amplitude and polarity in accordance with a sinusoidal signal component which is impressed upon the correlation signal output, having a frequency corresponding to that of the frequency translation error introduced during transmission and reception of the incoming digital code words. As shown in FIG. 4a, the nulls of the sinusoidal signal are such as to possibly result in a correlation output signal indicating a match being "missed" because the signal level is excessively low.

To eliminate this problem, the decoding system of the invention applies a frequency rotative component to the input of the correlation detector which, in effect, cancels the rotative component caused by the frequency translation error, thereby causing the correlation detector output phase to be stably maintained to produce an output signal of a relatively high level. This is accomplished by a feedback loop which includes peak finder 63, low pass filter 65, saw-tooth generator 87, voltage control oscillator 73, balance modulator 49, and low pass filter 51.

The feedback loop utilizes sawtooth generator 67 to provide a sawtooth waveform at the control input to voltage control oscillator 73 which varies the output frequency of oscillator 73 approximately symmetrically about the nominal chipping frequency $f_c$ by an amount sufficient to encompass any anticipated translation error. For example, a 1 Hz sawtooth can be used which sweeps voltage control oscillator 73 over $f_c \pm 100$ Hz.

The effect of the feedback system is to find and maintain a first local carrier frequency (output of VCO 73) whose frequency and phase maintain the output of correlation detector 53 at a level corresponding to the peak of the pseudorandom binary code word's correlation function, thereby eliminating effects of the frequency translation of the input signal.

Figure 4B:
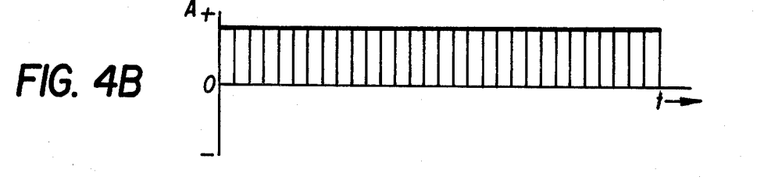

The peak filter 63 is a circuit which compares successive outputs from correlator detector 53 and generates an output which instructs the saw-tooth generator 67 to continue generating an increasing output waveform as long as the pulses from peak finder 63 are positive and the nth pulse is equal to or greater in amplitude than the n−1th pulse. This indicates that the output of the correlator 53 is at or is climbing towards a positive peak on the transfer frequency sinusoid (FIG. 4a). When the nth pulse amplitude is less than the n−1th pulse, the saw-tooth generator is stopped and, if the decline continues, the output from the saw-tooth generator 67 will be reduced until a stable operation at or near the envelope peak illustrated in FIG. 4a is achieved. The correlation detector 53 output, when the feedback loop is properly locked is illustrated in FIG. 4b.

Low pass filter 65, provided between peak finder 63 and saw-tooth generator 67, smooths the output from the peak finder 63 and makes the frequency generated by the voltage control oscillator 73 a function of the short term average of several pulses to prevent "hunting" and instability of the control loop.

Figure 5:
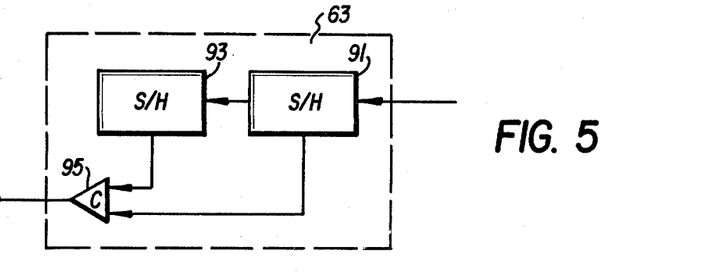
FIG. 5 illustrates a representative peak finding circuit which can be used in the FIG. 2 decoding system.

An exemplary peak finding circuit 63 which may be used is illustrated in FIG. 5. As shown therein, two sample and hold circuits 91 and 93 are provided for respectively receiving the nth and n−1th outputs from correlation detector 53. The outputs of the two sample and hold circuits are then fed to a comparator 95 which provides a positive output whenever the nth sample is greater than the n−1th sample and a negative output whenever the reverse is true. No output is provided if the two samples are equal. The output from comparator 95 is fed to low pass filter 65.

A mathematical analysis of the operation of the detranslation loop is as follows.

The incoming pseudorandom binary code words can be considered as an amplitude signal component, $w_m$ (actually there are many components consisting of harmonics of the word repetition rate and the analysis applies to each component), and a $w_t$ component which is the translation error component. Thus, the data exiting from high frequency receiver 43 can be expressed as:

$$A \cos (w_m + w_t)t \qquad (1)$$

where $w_t$ is a translation error component, $w_m$ is a signal frequency component, and A is the amplitude of the signal component.

As result of modulating this signal on the output of voltage control oscillator 73, the following signal is produced:

$$A \cos (w_m + w_t)t \times \cos (w_c + w_x) \qquad (2)$$

where $w_c$ represents the nominal center frequency of voltage control oscillator 73 and $w_x$ is the deviation from $w_c$ caused by the feedback loop.

Equation (2) can be rewritten as:

$$\tfrac{1}{2}A[\cos (w_c + w_m + w_x + w_t)t + \cos (w_c - w_m - w_t + w_x)t] \qquad (3)$$

Low pass filter 51 removes the higher frequency component (the first half of equation 3) resulting in:

$$\tfrac{1}{2}A \cos (w_c - w_m - w_t + w_x)t \qquad (4)$$

By varying the frequency component $w_x$ with the detranslation loop so that it equals $w_t$ equation 4 can be converted to $\tfrac{1}{2}A \cos (w_c - w_m)t$ so that $w_t$ is eliminated. By using this signal to modulate a second carrier fixed in frequency at $w_c$, the following is obtained, $$\tfrac{1}{2}A \cos (w_c - w_m)t \times \cos w_c = \tfrac{1}{4}A \cos [(2w_c - w_m)t + \cos w_m t] \qquad (5)$$

After filtering to remove the term containing $2w_c$, the original $\cos w_m t$ term is obtained which will correlate with the locally generated reference pseudorandom code words without distortions due to translation error.

Figure 3:
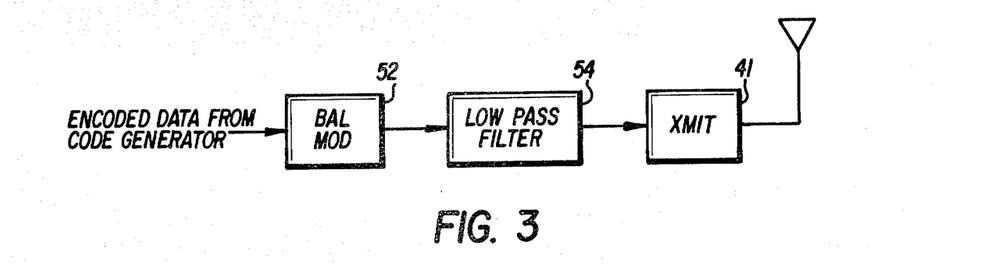
FIG. 3 illustrates a modification to the encoding system shown in FIG. 1.

As a modification to the detranslation system illustrated in FIG. 2, balanced modulator 52 and low pass filter 54 can be provided upstream of balanced modulator 49 and low pass filter 51, as functionally achieved by connecting the output of oscillator 101 to the carrier frequency input of balanced modulator 52 and the output of VCO 73 to the carrier frequency input of balanced modulator 49. Or, balanced modulator 32 and low pass filter 54 can be eliminated from the decoding system and instead provided in the encoding system just upstream of transmitter 41, as illustrated in FIG. 3.

As evident from the above, the described decoding system includes a detranslation loop which improves the quality of the correlation detector output by eliminating the effect of frequency translation errors thereat induced during the transmission and reception of a DC coded signal.

Although the decoding system illustrated in FIG. 2 may be used with the encoding system illustrated in FIG. 1, the principles of operation of the decoding system allow its use with other types of code transmission systems which need not employ pseudorandom coding, so long as the leading k chips of a transmitted data code word used (or any other easily recognized set of k chips) are the same as the k bits of data used to select the transmitted code word. The encoding system illustrated in FIG. 1 does have advantages, however, in providing pseudorandom binary code words for transmission which have desirable correlation characteristics and in providing pseudorandom binary code words which have an equal number of ones and zeros to thereby maintain a DC balance for the transmitted signal which simplifies decoding circuitry.

Although representative embodiments of the invention have been illustrated, it should be clear that various modifications can be made to these embodiments without departing from the spirit and scope of the invention. Accordingly, the invention is not limited by the foregoing description, but is only limited by the claims which are appended hereto.

What is claimed is:

1. A digital communications system comprising:
   means for generating a selected one of a plurality of n-bit binary code words from a received k-bit data word to provide a generated binary code word, where k and n are integers;
   means for transmitting said generated binary code word;
   means coupled to said transmitting means for receiving said generated binary code word;
   first modulation means for modulating the output of a variable frequency local oscillator having a predetermined center frequency with said generated binary code word;

second modulation means for modulating the output of a fixed frequency local oscillator with the output of said first modulation means;

a reference code generator for generating a plurality of digital reference code words;

correlation means coupled to the output of said second modulation means and said reference code generator for comparing each of said digital reference code words with said generated binary code word and for providing a correlation output signal representing the correlation of one of said plurality of digital reference code words with said generated binary code word;

means responsive to a changing characteristic of said correlation output signal for determining a frequency translation error which occurred during transmission and reception of said generated binary code word; and, means responsive to said determining means for adjusting the frequency of the output of said variable frequency oscillator in a direction to minimize the effect of said frequency translation error at the output of said correlation means.

2. A digital communications system comprising:

means for generating a selected one of a plurality of n-bit binary code words from a received k-bit data word to provide a generated binary code word, where k and n are integers;

means for transmitting said generated binary code word;

means coupled to said transmitting means for receiving said generated code word;

first modulating means for modulating the output of a fixed frequency local oscillator with said generated binary code word;

second modulating means for modulating the output of a variable frequency local oscillator with the output of said first modulation means;

a reference code generator for generating a plurality of digital reference code words;

correlation means coupled to the output of said second modulation means and said reference code generator for comparing each of said reference digital code words with said generated binary code word and for providing a correlation output signal representing the correlation of one of said plurality of digital reference code words with said generated binary code word;

means responsive to a changing characteristic of said correlation output signal for determining a frequency translation error which occurred during transmission and reception of said generated binary code word; and, means responsive to said determining means for adjusting the frequency of the output of said variable frequency oscillator in a direction to minimize the effect of said frequency translation error at the output of said correlation means.

3. A data communications system as in claims 1 or 2 wherein $n = 2^k$.

4. A data communications system as in claims 1 or 2 wherein $n = 2^k - 1$.

5. A data communications system as in claim 2 wherein said first modulating means coupled to the output of said receiving means.

6. A data communications system as in claim 2 wherein said first modulating means is coupled to the output of said generating means.

7. A data communications system as in claims 1 or 2 wherein each of said plurality of binary code words represents a particular start-stop phase of a repeating n-bit binary code pattern.

8. A data communications system as in claim 1 or 2 wherein said generating means generates an inverted one of said plurality of n-bit binary code words for at least one predetermined received k-bit data word.

9. A data communications system as in claims 1 or 2 wherein said adjusting means comprises a sawtooth wave generator, the output of which adjusts the output frequency of said voltage controlled oscillator, said sawtooth wave generator having its output voltage fixed at a point in a sawtooth waveform cycle which exists when said determining means determines that a peak value has occurred in the envelope of the output of said correlation means.

10. A data communiations system as in claim 9 wherein said determining means is a signal peak detecting means which determines the peak level of the envelope of said correlation means output signal.

11. A data communications system as in claim 10, further comprising a low pass filter connected between said signal peak detecting means and said sawtooth wave generator, said low pass filter smoothing the output of said signal peak detecting means.

12. A data communications system as in claims 1 or 2 wherein each of said first and second modulation means comprises a balanced modulator and a low pass filter connected to the output of said balanced modulator.

13. A data communications system as in claims 1 or 2 wherein said plurality of binary code words and said plurality of digital reference code words are pseudorandom binary code words.

14. A data communications system as in claim 3 wherein said plurality of binary code words each contain an equal number of ones and zeros.

15. An encoding system for transmitting digital code data comprising:

means for receiving k-bit data words;

means for generating from a received k-bit data word, a selected one of a plurality of n-bit pseudorandom code sequences which is assigned to said received k-bit data word and for adding to said selected pseudorandom code sequence at least one additional binary bit to produce a pseudorandom code word which contains an even number of data bits, half of which are of ones and half of which are zeros; and means for tansmitting said pseudorandom code word at a predetermined chipping frequency to a receiver.

16. An encoding system as in claim 15 wherein said means for generating said pseudoramdom word code comprises: a pseudorandom code generator which receives said k-bit data word and generates, at an output thereof, said selected pseudorandom code sequence and, means for temporarily halting operation of said pseudorandom code generator and inserting at least one additional binary bit at the output of said pseudorandom code generator in response to the detection of a predetermined state of said pseudorandom code generator.

17. An encoding system as in claim 16 wherein said at least one additional binary bit is generated by halting operation of said pseudorandom code generator for a predetermined number of its operating clock cycles such that said at least one additional binary bit is generated at the time of said halting by the immediately preceeding output state of said pseudorandom code generator.

18. An encoding system as in claim 16 further comprising means for modifying a received k-bit data word when it represents a predetermined digital value and supplying said modified k-bit data word to said pseudorandom code generator.

19. An encoding system for transmitting digital code data comprising:
   means for receiving k-bit data words;
   means for generating from a received k-bit data word a selected one of a plurality of n-bit pseudorandom code words which is assigned to said received k-bit data word, said means for generating being responsive to at least one predetermined k-bit data word to generate one of said plurality of pseudorandom code words with an inverted polarity; and,
   means for transmitting the pseudorandom code words produced by said generating means.

20. A data decoding system comprising:
   means for receiving a plurality of n-bit binary code words respectively generated from k-bit data words, where k and n are integers;
   first modulating means for modulating the output of a variable frequency oscillator having a predetermined center frequency with said received n-bit binary code words;
   second modulation means for modulating the output of a fixed frequency local oscillator with the output of said receiving means;
   a reference code generator for generating a plurality of digital reference code words;
   correlation means coupled to the output of said second modulation means and said reference code generator for comparing each of said digital reference code words with said generated binary code word and for providing a correlation output signal representing the correlation of one of said plurality of digital reference code words with said generated binary code word;
   means responsive to a changing characteristic of said correlation output signal for determining a frequency translation error which occurred during transmission and reception of said generated binary code word; and,
   means responsive to said determining means for adjusting the frequency of the output of said voltage controlled oscillator in a direction to minimize the effect of said frequency translation error at the output of said correlation means.

21. A data decoding system comprising:
   means for receiving a plurality of n-bit binary code words respectively generated from k-bit data words, where k and n are integers, said n-bit binary code words being modulated by first modulation means on the output of a fixed frequency oscillator;
   second modulation means for modulating the output of a variable frequency local oscillator with the output of said first modulation means;
   a reference code generator for generating a plurality of digital reference code words;
   correlation means coupled to the output of said second modulation means and said reference code generator for comparing each of said digital reference code words with said generated binary code word and for providing a correlation output signal representing the correlation of one of said plurality of digital reference code words with said generated binary code word;
   means responsive to a changing characteristic of said correlation output signal for determining a frequency translation error which occurred during transmission and reception of said generated binary code word; and,
   means responsive to said determining means for adjusting the frequency of the output of said voltage controlled oscillator in a direction to minimize the effect of said frequency translation error at the output of said correlation means.

22. A data decoding system as in claims 20 or 21 wherein $n = 2^k$.

23. A data decoding system as in claims 20 or 21 wherein $n = 2^k - 1$.

24. A data decoding system as in claims 20 or 21 wherein each of said plurality of binary code words represents a particular start-stop phase of a repeating n-bit binary code pattern.

25. A data decoding system as in claim 22 wherein said plurality of binary code words each contain an equal number of ones and zeros.

26. A data decoding system as in claims 20 or 21 wherein said adjusting means comprises a sawtooth wave generator, the output of which adjusts the output frequency of said voltage controller oscillator, said sawtooth wave generator having its output voltage fixed at a point in a sawtooth waveform cycle which exists when said determining means determines that a peak value has occurred in the envelope of the output of said correlation means.

27. A data decoding system as in claim 26 wherein said determining means is a signal peak detecting means which determines the peak level of the envelope of said correlation means output signal.

28. A data decoding system as in claim 27 further comprising a low pass filter connected between said signal peak detecting means and said sawtooth wave generator, said low pass filter smoothing output of said signal peak detecting means.

29. A data decoding system as in claim 20 wherein each of said first and second modulation means comprises a balanced modulator and a low pass filter connected to the output of said balanced modulator.

30. A decoding system as in claim 21 wherein said second modulation means comprises a balanced modulator and a low pass filter connected to the output of said balanced modulator.

31. A data decoding system as in claims 20 or 21 wherein said plurality of binary code words and said plurality of digital reference code words are pseudorandom binary code words.

* * * * *